W. C. ZELLE.
IMPLEMENT HOLDER FOR TILLING MACHINES.
APPLICATION FILED DEC. 4, 1912.
1,130,364.
Patented Mar. 2, 1915.
2 SHEETS—SHEET 1.
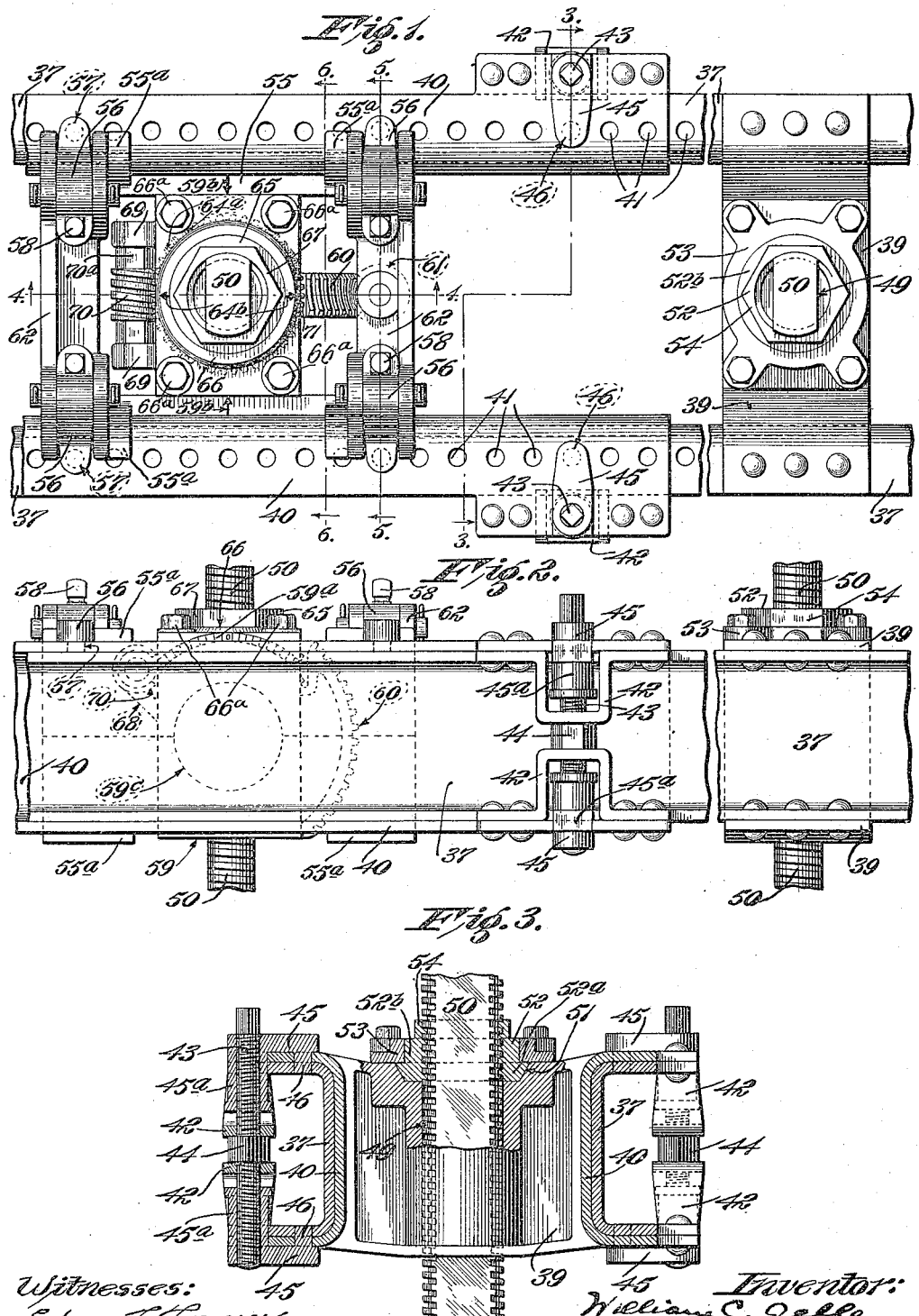

W. C. ZELLE.
IMPLEMENT HOLDER FOR TILLING MACHINES.
APPLICATION FILED DEC. 4, 1912.
1,130,364.
Patented Mar. 2, 1915.
2 SHEETS—SHEET 2.
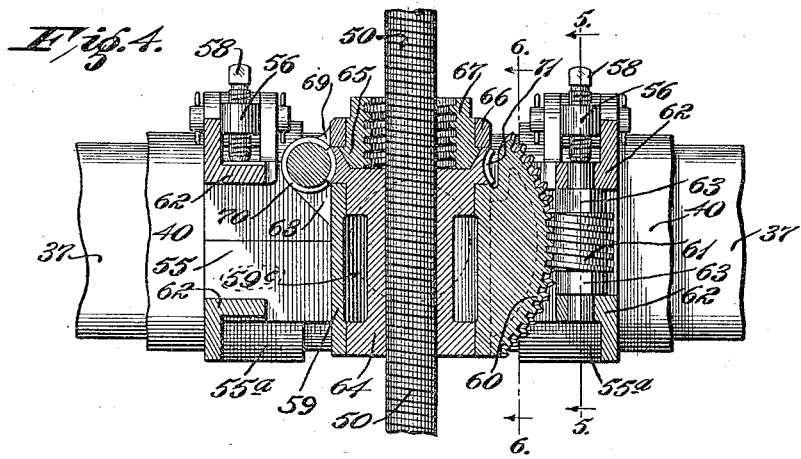
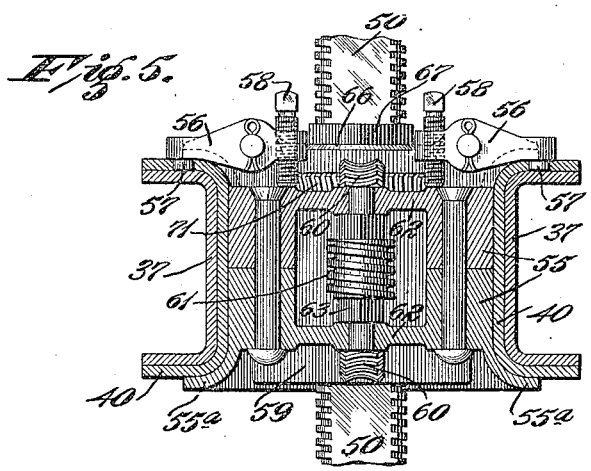
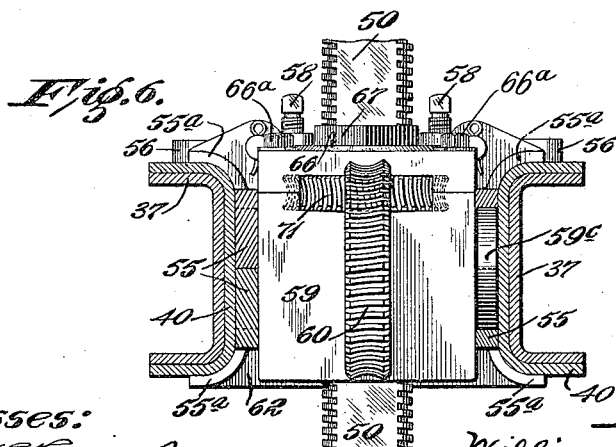

UNITED STATES PATENT OFFICE.

WILLIAM C. ZELLE, OF ST. LOUIS, MISSOURI, ASSIGNOR TO PLANTATION EQUIPMENT COMPANY, OF ST. LOUIS, MISSOURI, A CORPORATION OF MISSOURI.

IMPLEMENT-HOLDER FOR TILLING-MACHINES.

1,130,364. Specification of Letters Patent. Patented Mar. 2, 1915.

Original application filed June 17, 1912, Serial No. 704,037. Divided and this application filed December 4, 1912. Serial No. 734,834.

*To all whom it may concern:*

Be it known that I, WILLIAM C. ZELLE, a citizen of the United States, and a resident of the city of St. Louis and State of Missouri, have invented a new and useful Improvement in Implement-Holders for Tilling-Machines, of which the following is a specification.

This invention relates to implement holders for tilling machines, and its subject-matter is divided out of an application for Letters Patent of the United States, for a tilling machine, filed by me on June 17, 1912, Serial Number 704,037.

The invention has for its principal objects to provide for the attachment to a carrier implements or tools of various kinds interchangeably; to provide for adjusting the implements to various heights, and for setting them at different angles or working positions; and to attain certain advantages which will hereinafter more fully appear.

The invention consists in the parts and in the arrangements and combinations of parts hereinafter described and claimed.

In the accompanying drawings which form part of this specification and wherein like symbols refer to like parts wherever they occur,—Figure 1 is a fragmentary top plan view of an implement carrier with an adjustable implement holder thereon, illustrating an embodiment of the invention; Fig. 2 is a side elevation; Fig. 3 is a section on the line 3—3 of Fig. 1; Fig. 4 is a section on the line 4—4 of Fig. 1; Fig. 5 is a section on the lines 5—5 of Figs. 1 and 4; and Fig. 6 is a section on the lines 6—6 of Figs. 1 and 4.

The device illustrated in the drawings is designed more particularly to be used in connection with the kind of carrier or drag set forth and claimed in said application Serial Number 704,037 of which this application is a division, but it is obvious that the device may be modified so suit other structures. Only so much of the carrier or drag frame is shown as is necessary to a full understanding of the present invention.

Generally stated, the carrier or drag comprises a frame hinged to a supporting device which is movably mounted on a tractor or vehicle and arranged and adapted so that the carrier or drag may be raised and lowered without disturbing the particular working position for which it is set. The tractor and supporting device are set out with particularity and claimed in applications Serial Number 687,929, filed April 1, 1912, and Serial Number 704,036, filed June 17, 1912.

The carrier or drag comprises transverse channel members 37 which are arranged in spaced pairs with their webs vertical and flanges disposed outward. These channel members have their middle portions riveted to a strut member 39. The end portions of said channel members are riveted to yokes or brackets not shown, but which may be pivoted to the drag frame so that said carrier members may be rocked and set at various angular positions as set out with more particularity in said application Serial Number 704,037. Channel members 40 are fitted slidably over the channel members 37, and the flanges of both the members 37 and the members 40 are provided with a multiplicity of perforations 41 adapted to register so as to receive locking pins as will presently appear. The channel members 37 and 40 have their flanges extended laterally, the former at their outer ends and the latter at their inner ends, and riveted to said extensions are oppositely disposed substantially U-shape clips 42 in which right and left hand double screws 43 are swiveled. The screws have collars 44 located between the clips provided with polygonal faces for the reception of a wrench. Locking members 45 have shank portions 45$^a$ threaded on the screws 43. They also have pins 46 adapted to enter the registered perforations 41 in the flanges of the channel members. Portions of the shanks are made square so as to work in square notches in the flanges of the channel members in order to hold them from turning; while inwardly from said square portions they are rounded in order to permit them to turn after the square portions are moved clear of said notches.

By rotating the screws 43 the locking members 45 are drawn toward each other to bring the projections 46 into the perforations 41 and thereby lock the sliding channel members with respect to the fixed ones. The implement carrier or drag thus comprises a rigid frame having extensible transverse members on which individual holders for the implements to be presently described are adjustably and interchangeably mounted.

The middle strut member 39 is provided with a central vertical opening 49 through which the shank of an implement may be passed. This opening 49 is preferably made to correspond with the contour of a shank 50 having flattened opposite faces whereby the shank is permitted endwise movement but is prevented from rotating therein. The strut member is provided with a circular recess 51 having tapered side walls adapted to receive a nut 52 having a beveled flanged end portion 52$^a$ which is a counterpart of the recessed portion of the strut. A securing plate 53 having a central opening in which the circular middle portion 52$^b$ of the nut fits is secured on top of the strut to hold the nut in place. The projecting upper portion 54 of the nut is provided with polygonal faces for the reception of a suitable wrench. The shank 50 is screw-threaded for a portion of its length to fit the nut by the rotation of which latter in its seat said shank is raised and lowered.

Adjustable implement holders comprising substantially rectangular frame-like members 55 having seat portions 55$^a$ on opposite sides which are counterparts of the channel members are adapted to be detachably secured to the slidable channel members 40. These implement holders are provided with pivoted dogs 56 having pins or projections 57 adapted to enter the perforations 41 in the channel members so as to hold said holders in place. The dogs 56 are provided with screws 58 adapted to bear against the top of the holder frame so that said dogs may be held with their pins 57 in the respective perforations of the channel members.

The holder frame members have rocking members 59 swiveled therein, the axis of the trunnions 59$^c$ of said rocking members being at right angles to the channel members 37 and 40. The rocking member 59 is provided with a sector 60 adapted to coöperate with a worm screw 61 journaled in brackets 62 on the members 55. This worm screw 61 is provided with polygonal faces 63 for the reception of a wrench.

Swiveled vertically in the rocking member 59 is a shank holder 64 having an opening therethrough whose sides are flattened to correspond with the flattened sides of the shank 50 of the implement. The shank holder is provided with a beveled seat adapted to receive the counterpart end portion of a nut 65. The nut 65 is held in place by a plate 66 having a central opening in which the middle portion of the nut is rotatably fitted. The plate 66 is rectangular and is secured by cap screws 66$^a$ to the rocking member 59. The upper portion 67 of the nut is provided with polygonal faces for the reception of a wrench. The rocking member 59 is provided with a pair of half journal brackets 68 with which similar brackets 69 on the plate 66 coöperate. Journaled in these bearings is a worm screw 70 which meshes with a worm wheel 71 on the swiveled shank holder 64 whereby the latter may be rotated. This worm screw is also provided with polygonal faces 70$^a$ to receive a wrench.

By adjusting the channel members 40 with respect to the channel members 37 the implement carrier or drag frame may be extended or contracted to different widths. The implement holders, with the exception of the one mounted on the middle strut member, may also be placed at any desirable position lengthwise of the channel members, and the implements set at various angles. The implement holder at the middle of the frame is, however, capable of vertical adjustment. This adjustment is all that is necessary as the middle implement always travels along the middle of a furrow in a neutral position. It is different, however, with respect to the other implements on either side of the middle one, as they have to be set at various angles in order to throw the dirt toward or away from the middle of the furrow, depending upon the nature of treatment.

Various combinations may be arranged by adjusting the implement holders on a carrier or drag frame. For example, in "barring-off" a plow may be mounted at either side of the holder frame so that the soil is only treated adjacent to the plants at the tops of the furrows without touching the middles. In another case a double mold board may be mounted at the middle of the frame and on either side thereof may be arranged right and left hand plows for throwing a little dirt to the plants on opposite sides of the furrow, and at the same time stirring the soil to kill the grass and weeds. Then, again, the soil may be stirred with shovel blades which may be arranged transversely to the direction of travel, in which case they do not throw earth to the plant, nor from it. Obviously, however, the shovels may be set so that the soil can be thrown toward or from the plant, as desired. Also, in "laying-by," the dirt may be started at the middle of the furrow with a double mold board plow, then throwing it closer to the plants by right and left hand mold board plows, and, finally, throwing the soil into the plant with sets of disks. So, too, the entire furrow may be cultivated with disks. There may be a set of disks arranged to throw the dirt away from the plant at the top of the furrow, followed by a set of disks throwing the dirt from the middle toward the plants and these followed by other sets of disks picking up the dirt and throwing it still nearer the plants, and, finally, sets of disks throwing the dirt into the plants. These and any other desirable combinations may be effected owing to the universal adjustment of the device.

The rocking members 59 are provided with arcuate scales 59ª on their side faces in coöperate relation to indicator marks 59ᵇ on the adjacent top face of the implement holder frame 55; while the rotary shank holder 64 has about its upper peripheral portion, preferably on the upper ends of the teeth of the worm gear 71, a series of graduations 64ª which may be arranged in two series on opposite sides, or, obviously, as a continuous annular series entirely girdling the member. These graduations 64ª are used in connection with indicator marks 64ᵇ on the plate 66 which holds the nut 65 and shank holder 64 on the rocking member 59.

Obviously, the device admits of considerable modification without departing from the invention. Therefore, I do not wish to be limited to the specific construction and arrangement shown.

What I claim is:

1. The combination with a pair of spaced supports, of an implement holder comprising a frame engaging said supports at its opposite sides, locking elements on said frame adapted for releasable engagement with said supports, a member swiveled horizontally in said frame, means for rocking and holding said horizontally swiveled member in adjusted position, a member swiveled vertically in said horizontally swiveled member, means for rotating and holding said vertically swiveled member in adjusted position, said vertically swiveled member having an axial opening therethrough, an implement shank slidable endwise through said axial opening in the vertically swiveled member, but held from rotation therein, and means on said vertically swiveled member for moving said shank endwise and holding it in adjusted position.

2. An implement holder comprising an open frame having means of support at opposite sides, locking elements on said frame adapted for releasable engagement with carrier members for said frame, a member swiveled horizontally on opposite sides of the frame, said horizontally swiveled member having a toothed sector at one side, a worm screw swiveled vertically on the adjacent side of said frame in operative engagement with said sector, a member swiveled vertically in said horizontally swiveled member, the axes of the two swiveled members intersecting, said vertically swiveled member having an axial opening therethrough, an implement shank slidable endwise through said axial opening but held from rotation therein, said shank being screw-threaded, a nut swiveled axially on said vertically swiveled member and engaging the threaded portion of said implement shank so as to support and adjust said shank, and a worm gear on said vertically swiveled member, a worm screw swiveled on said horizontally swiveled member in operative engagement with said worm gear.

3. The combination with a pair of spaced supports, of an implement holder comprising a supporting base engaging said supports at its opposite sides, a member swiveled horizontally on said base and having a toothed sector thereon, a worm-screw on said base engaging said sector, a shank-receiving portion swiveled vertically in said horizontally swiveled member, said vertically swiveled member having a worm-gear thereon, a worm-screw on said horizontally swiveled member engaging said worm-gear, a screw-threaded implement shank fitted slidably in said shank-receiving portion, and a nut swiveled on said vertically swiveled member and adapted to engage the screw-threaded portion of the implement shank.

4. An implement holder of the character described, comprising a horizontal body frame having provision for its support at opposite sides, a pivotal member having trunnions at opposite ends journaled in said body frame in a horizontal frame, means for rocking said pivotal member and holding it in rocked position, said means including a toothed sector on said pivotal member and a coöperating worm screw on said body frame, a shank-receiving member swiveled vertically through said pivotal member, said shank-receiving member having an axial opening therethrough adapted to receive an implement shank and arranged so that the latter may move endwise but not rotatably therein, a nut swiveled on said shank-receiving member and adapted to engage the implement shank so as to move the latter endwise and hold it in adjusted position, and means for turning said shank-receiving member and holding it in adjusted position, said means including a toothed gear on said shank-receiving member and a worm screw on said pivotal member.

5. In an implement holder, a pair of supports each provided with a series of apertures, an implement holder mounted on said supports at its opposite sides, and having two series of apertures adapted to register with said first-named series of apertures, pivoted locking members mounted on said holder and adapted to enter registered apertures in said supports and said holder, and screw-threaded means for operating said locking members.

6. In an implement holder, a pair of spaced supports, an implement holder slidably mounted on said supports at its opposite sides, pivoted locking members mounted on said holder adapted to secure said holder to said supports, and screw-threaded means for operating said locking members.

7. The combination with a pair of spaced supports, of an implement holder frame comprising upper and lower blocks, each block having means at its opposite ends engaging said supports, means securing said blocks together in operative engagement with said supports, bearings in said implement holder frame formed by mating recesses in each of said upper and lower blocks, and an implement holder having trunnions mounted in said bearings.

Signed at St. Louis, Missouri, this 29th day of November, 1912.

WILLIAM C. ZELLE.

Witnesses:
G. A. PENNINGTON,
PAULINE AMBERG.

Copies of this patent may be obtained for five cents each, by addressing the "Commissioner of Patents, Washington, D. C."